Patented May 3, 1938

2,116,073

UNITED STATES PATENT OFFICE 2,116,073

COMPOSITION OF MATTER AND METHOD OF MAKING THE SAME

Walter J. Koenig, Philadelphia, Pa., assignor to Sloane-Blabon Corporation, Philadelphia, Pa., a corporation of Delaware No Drawing. Application December 22, 1934, Serial No. 758,863

19 Claims. (Cl. 260—2)

This invention relates to a novel composition of matter to a novel method of making the same and to a novel method of drying oils and oleaginous compositions. More particularly the invention relates to an oleaginous composition for coating, plastics and the like especially adapted for use in the manufacturing of floor covering materials, etc., and to resinous products derived from said oleaginous compositions and to novel methods by which the oleaginous compositions are reacted to form resinous products, and particularly to the method of drying such oleaginous compositions by resin-forming reactions.

This application is a continuation in part of my prior co-pending application Serial No. 646,148 filed September 7, 1932, entitled Composition of matter and method of making the same, now Patent No. 2,058,596. In my said prior application I have disclosed the methods of drying oils by a resin-forming condensation and a number of compositions suitable for drying by such methods. With similar objects in view to those set forth in my said prior application I have now discovered that by combining the oil with a resin-forming compound adapted to condense therewith so as to form a closed chain by the union of the two molecules, especially desirable results may be obtained and the products will be extremely tough and pliant.

I have discovered furthermore that if the compound is a ring compound having a reactive linkage at which it is adapted to combine with the molecule of the oil to form a closed ring structure, and especially if it is a compound with the characteristic structure

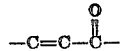

that the advantages of my invention will be most fully attained.

In my said co-pending application I have disclosed the drying of oils with production of tough, pliant resinous products by condensation with aryl - alpha - keto - tetrahydro - naphthalene. Research upon the condensation reaction involved indicates that the reaction occurs by the destruction of one double bond, or, in other words, changing one double bond to a single bond in the formation of a complex molecule, and it further appears that the presence of the double-bonded oxygen atom favors this condensation reaction.

I have now found that other compounds having similar characteristic molecular structures react in a similar way to give especially desirable condensation products with the drying oils. Most desirable among those which have been tried are maleic anhydride and quinone. In both of these compounds it will be noted that the characteristic structure referred to above is made symmetrical by the presence of an additional C-atom with a double bonded O-atom attached thereto. I have found that the most desirable results are attained when this symmetrical structure is present as in the case of maleic anhydride and quinone.

Furthermore, I have found that the double bond of the characteristic structure should be in a position where it is free to break and combine with the oil to form a new ring. If this results in the formation of a double ring or a condensed nucleus compound resulting products will be possessed of especially desirable properties. If substitution groups other than those indicated by the bonds represented in the characteristic formula given above are present at the double bonded C-atoms they are likely to interfere with the condensation reaction.

Thus I have found that with phthalic anhydride, although this characteristic structure is present, one double bonded C-atom is common to both rings of the phthalic anhydride structure, and, therefore, has an additional substitution beyond that indicated by the characteristic formula given above. Apparently for this reason, the phthalic anhydride preferentially condenses with the oil and at the double bonded O-atoms. I have not yet been able to establish whether under favorable conditions the reaction can be made to take place at the double bond of the benzene ring, but I have established that this compound gives highly desirable and satisfactory condensation products with the oil.

Another compound of this type is dimethylpyrone in which a methyl group is substituted on one of the double bonded C-atoms.

Other compounds which exhibit this multiple substitution of a double bonded C-atom in the characteristic structure are citric anhydride, citraconic anhydride, itaconic anhydride, and pyrocinchonic anhydride. Substances of this type, however, can be used satisfactorily and apparently form condensation products according to the present invention perhaps due to a molecular rearrangement which is known frequently to occur with compounds of this type. Citric acid and the other acids corresponding to the anhydrides mentioned and aconitic acid may also be used as raw materials since these are readily converted into the anhydrides under conditions suitable for reaction with the oil.

Fumaric acid and maleic acid may also be mentioned as examples of the related compounds which are suitable for the purposes of my invention although they do not include the characteristic structure directly. Both of these substances may be converted into maleic anhydride under conditions suitable for reaction with the oil. Maleic acid, furthermore, may be converted, in part at least, into coumalic acid in which the characteristic structure occurs in a lactone ring.

As amply illustrated by the above examples, the double bonded O-atom may be an oxygen of the anhydride structure. Apparently, however, there is a steric hindrance if the oxygen is in a carboxylic acid group instead of in an anhydride group. Thus with maleic acid there is apparently no reaction with the oil until the temperature is reached at which the acid is converted into the anhydride after which a violent reaction occurs.

Referring specifically to maleic anhydride as one preferred example of my invention, I have found that the best results are obtained when the maleic acid or anhydride is present in substantially less than full molecular equivalent.

I have found that the products having the most desirable properties are those which have the most complex molecular structure, and it is desirable therefore to choose condensations which will give the largest and most complex molecules possible. I have found, for example, that if a condensation product of the oil and maleic anhydride, especially one resulting from reacting molecular equivalents, is further condensed with anithol, glycerol or terpineol, a more stable, tougher and especially a more alkali-resistant film is produced. Apparently these substances condense at the anhydride structure of the maleic molecule even after it has condensed with the oil at its double bonded C-atoms. This is more fully described and claimed in my application Serial No. 758,864 filed herewith.

It will already have been appreciated by those skilled in the art that a feature of primary importance of the present invention is that the reactions herein disclosed are capable of drying the oils in films without objectionable distortion, whether the oil is extended upon a surface of large area or as an adhesive film or particles of a plastic composition. It constitutes, therefore, not only a method of obtaining novel resinous compositions, but even more important—a method of drying oils by converting them into such resinous products directly, and after they have been given their form as finally desired.

It is of primary importance, moreover, that according to the present invention the reaction can be initiated en masse and then interrupted at a point short of complete drying. Thus the more costly final step of heating the finished article can be reduced to a very short treatment. With nearly all of the resin-forming condensation reagents this interruption can be so nearly complete that the partially reacted products can be stored indefinitely at cool room temperatures. The maleic anhydride reaction, however, does not stop at room temperatures, so that it is important to use the partially reacted materials promptly and not to make up too large stocks of such materials in advance.

I have found that the reaction between the oil and the maleic anhydride will occur slowly and will tend gradually to solidify the oil even at atmospheric temperatures. If the reaction is carried too far at high temperature the oil may go solid immediately or before it can be used, but if the reaction is not carried too far at high temperature the drying will proceed slowly so that there will be adequate time to use the oils for commercial purposes before they go solid. The reaction with maleic anhydride proceeds slowly even at room temperature and rapidly at temperatures above 170° F. In practice I have found that it is most satisfactory to blend the maleic anhydride or maleic acid and China-wood oil, e. g., seven seconds blown China-wood oil, by heating fairly rapidly to a temperature of about 200° F. and then cooling almost immediately. Products thus made will keep for several weeks but will dry rapidly when heated, e. g., to a temperature above 170° F.

As one example of an enamel made according to my present invention, I may blend 100 parts by weight of 7 seconds blown China-wood oil
10 parts by weight of maleic anhydride Heat to 200° F. and allow to cool. A sufficient quantity of mineral spirits can then be added to obtain desired working properties.

The resulting vehicle may be ground with pigments in the usual way, e. g.,

| | Parts by weight |
|---|---|
| Zinc oxide | 20 |
| Lithopone | 100 |
| Barytes | 100 | may be mixed in 100 parts of the vehicle just described and ground on a paint mill. The resulting composition is an excellent enamel, drying in 72 hours at 140° F. with a perfect gloss and an almost pure color without discoloration from the vehicle.

The vehicle may, of course, be used to form other paints or enamels, as will be obvious to those skilled in the art, or may be used alone as a varnish or protective coating, if cured at super-atmospheric temperatures.

It may also be used in plastic compositions as the adhesive binder. However, in this case, the China-wood oil is preferably blown to a heavy consistency. Maleic anhydride is then added and the mixture heated with stirring at 275° F. to proper consistency. The cement can be altered by the addition of resins, for example:

| | Parts by weight |
|---|---|
| Heavy blown China-wood oil | 1050 |
| "I" rosin | 320 |
| Kauri gum | 160 |
| Maleic anhydride | 70 |

The blown oil, "I" rosin and Kauri gum are heated together while stirring at 250° to 275° F. Add maleic anhydride and continue heating at 275° F. and mixing until proper viscosity is obtained. After the maleic anhydride is added, the bodying effect is very rapid. Usually ten to fifteen minutes is sufficient.

Either of the above cements can be used in compositions, as follows:

| | Parts by weight |
|---|---|
| Peruvian ochre, or other pigments | 15 |
| Wood flour | 10 |
| Ground cork | 50 |
| Gelled, or semi-solid vehicle | 60 |

This vehicle may, for example, consist of 120 parts of blown China-wood oil, viscosity nine seconds Gardner-Holt at 86° F.
80 parts 25-gal. varnish (i. e. 25 gallons of China-wood oil to 100 lbs. of phenol formaldehyde resin, such as bakelite XR 420, or Durez 525)
17½ parts cyclohexanol
17½ parts cyclohexanone The ingredients of the vehicle are refluxed at about 350° F. until desired consistency is attained, and are then mixed with the other ingredients, e. g., in a German or Banbury mixer, and calendered by means of rolls in the usual way.

For an inlaid linoleum, a similar procedure may be adopted preferably, however, using a composition consisting of:

| | Parts |
|---|---|
| Wood flour | 30 |
| Lithopone, or other pigments | 30 |
| Vehicle | 30 |

The reaction between the condensing reagent and the oil may take place with very little oxidation, and the oil may be dried into excellent films in nitrogen containing only a trace of oxygen, (e. g., 0.2%) at super-atmospheric temperatures, e. g., 140° F. to 220° F. A small amount of oxidation, however, does stimulate the reaction and improve the properties of the resulting products.

In this connection, also, I have found that, in general, for the resin-forming condensation drying slightly oxidized oils are preferred, e. g., a 7" (Gardner-Holt) blown China-wood oil; apparently China-wood oils oxidized to the point at which the maximum peroxide is first reached are most reactive. At this point only one-third of the double bonds are oxidized, leaving two conjugate double bonds free for the condensation.

This is true in particular for the condensation with resin-forming compounds having the

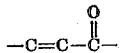

structure according to the present invention, i. e., slightly oxidized oils are more advantageous.

It will be noted that if two of the characteristic chains referred to above are written together in a ring, viz.,

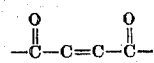

the result is the formula of quinone. Thus there are two reactive linkages of these characteristic chains and apparently the oil molecules may combine at both of these linkages so that the quinone may form a bridging molecule tying two molecules of the oil together, and thus forming a complex molecular chain with the practical results that the oil is dried to form extremely high quality hard and tough films.

Up to equi-molecular proportions an increase in the amount of quinone present improves the quality of the product. Beyond this point, however, further increases are not justified by improved results. In considering reacting percentages, however, it should be remembered that the quinone sublimes at the melting point.

When quinone is used as the condensing agent, the rate of drying of the film is slower than comparable films containing other condensing agents, but the resulting film is considerably more alkali-resistant. This increased alkaline resistance is probably due to the formation of a more complex molecule. The preferred curing temperature is approximately 220° F. Below 180° F. the rate of drying is very slow and probably may not be considered a commercial success at the lower temperatures.

In order to avoid excessive sublimation of the quinone, I prefer to heat the mixture just enough to dissolve the quinone, or to carefully control the heating preferably with refluxing or pressure control. As one example of a vehicle made with quinone according to my invention, I may mix:

| | Parts by weight |
|---|---|
| 7" Gardner-Holt at 86 F. China-wood oil | 100 |
| Quinone | 10 |

This vehicle may be used as a clear coating or may be solidified directly to form a resinous mass, or it may be mixed with pigment or with fillers, etc., to form paint plastics, etc., e. g., as set forth above in connection with the maleic anhydride vehicles.

Other compounds may be used instead of maleic anhydride and quinone, as already mentioned. I have found that the most desirable of these compounds are the aromatic ketones having the characteristic structure, of which pyrone, coumarin and coumaranone may be given as further examples, and the closed ring anhydrides having said structure. And with all these types I prefer those in which the unsaturated C-atoms are not attached to side chains or other rings.

In so far as these are heterocyclic compounds they fall specifically within the scope of my co-pending application Serial No. 758,859, filed herewith now Patent No. 2,058,597.

I have found that the presence of a small amount of reactive resin, such as phenol-formaldehyde and coumarone resins, is advantageously incorporated as a varnish or ground into the oil like a pigment improves greatly the properties of the resulting composition. As compared with the same composition, omitting the resin, a smoother film, more glossy and tougher, ordinarily results.

Various resins, both reactive and unreactive, may be used in the composition as will be obvious to those skilled in the art of manufacturing paints and varnishes and plastics, etc.

It is to be understood that the proportions and the particular ingredients specified in the above examples are given only to illustrate the invention and the manner of practicing it by certain specific examples and that these proportions and ingredients can be varied within relatively wide limits without departing from the scope of my invention. For example, it will be readily understood that the proportions of thinner, preferably mineral thinners, will depend primarily upon the consistency desired and this may be varied, as will be apparent to anyone skilled in the art.

As already stated, the proportions of the condensing reagents may be substantially varied. If it is desired to obtain the more flexible and tougher films characteristic of those formed by bonding molecules of the oils together with a condensing reagent capable of reacting at two parts of the same molecule with different molecules of the oil, it is important that the proportions of the condensing reagent should be limited. Except for this an excess of the condensing reagent is not objectionable and will ordinarily be driven off as vapor during the heating or drying of the composition.

Other oils, in which I include treated and untreated drying oils, treated semi-drying oils and non-drying oils, that possess double bonds in conjugate arrangement, e. g., —C=C—C=C—, or —C=C—C=C—C=C—, (such as, China-wood oil, fish oils, oiticica oil, blown or properly oxidized linseed oil, blown or properly oxidized soya bean oil, blown or properly oxidized poppyseed oil, etc., castor oil heated under reduced pressures to form conjugate double bond structure and esterified, blown or properly oxidized drying oil fatty acids, and the above treated and untreated oils, having the above double bond conjugate structure, blown with drying oil fatty acids or such oils to which blown or properly oxidized fatty acids have been added), fall within the scope of my invention.

I prefer to use blown or properly oxidized oils, although the raw oils having the above described conjugate double bond arrangement will dry in accordance with my invention.

With the characteristic structure referred to above, the reaction apparently occurs primarily at a conjugate double bond structure such as is present in elaeostearic acid of China-wood oil, or such as is present in fish oil, blown linseed and blown or dehydrated castor oils. Of all the commercially available oils, China-wood oil has been found to give the best results and other less advantageous oils may be improved by the addition of fatty acids of China-wood oil, or by mixture of China-wood oil therewith.

The temperatures specified in the example have been chosen, of course, with practical commercial conditions in mind. Other temperatures may be used. With quinone higher temperatures are apparently necessary, but with other condensing reagents temperatures around 140° F. may be preferable and temperatures as low even as 115° F. may be used in some cases. Temperatures much above 200° F. may result in discoloration, and where they are not necessary, it is ordinarily desirable to maintain lower temperatures. However, I have used temperatures as high as 300° F. with very satisfactory results and in most cases even higher temperatures can be used.

In an example given above, drying is preferably conducted in an atmosphere of gases given off by the film, or in substantially pure, inert atmosphere.

Where a gelled vehicle is desired, the thinner may be partially or entirely omitted and the heat treatment continued until the desired viscosity is obtained, as will be readily understood by those skilled in the art. In this case also, it may be desirable to body the oil to a somewhat heavier consistency before the condensing reagent is added.

In the examples I have referred particularly to paints, enamels, varnishes, and plastics because the invention is of great practical importance in the field of floor covering materials. It is to be understood, however, that my invention is of much wider application than the field of floor coverings and may be applied generally to all sorts of protective and decorative coatings and molded or machined resinous products, including besides paints, enamels and varnishes, such as would be used in floor covering, printing ink, lithograph varnishes, coatings for tin cans, etc., coating impregnating and insulating varnishes, protective coatings for automobiles, machinery, furniture and other articles and plastics for electrical insulation, chemically resistant articles and household utensils, decorative objects, implements, handles, etc., to mention only a few of the numerous applications of my invention.

It seems clear that a condensation occurs. The extent of condensation depends on the condensing agents used, but regardless whether the condensation is partial or practically complete, the reaction falls within the scope of this invention, since my invention embraces rapid drying action at super-atmospheric temperatures in substantially non-oxidizing atmospheres as due to the condensation.

In the case of partial condensation, i. e., where the amount of condensing agent is less than in stoichiometric relations, it is my theory that the presence of the particular type of condensation product of the oil and condensing agents is responsible for the rapid drying. The invention described herein cannot be construed in the same light as the action of driers, as the action proceeds unimpeded or rapidly, as the case may be, in substantially non-oxidizing atmospheres at super-atmospheric temperatures with definite favorable results starting as low as 120° F., which differentiates from polymerization and oxidation under similar conditions.

If more than one condensing agent is used, it is not necessary to add the several condensing agents as a mixture at the start of the reaction. The reaction may be started with a single condensing agent, and after the reaction has progressed to any point before becoming a solid mass, the reaction may be retarded by merely cooling the mixture. Additional condensing agent may then be added, if desired, and the reaction accelerated again by merely raising the temperature. The addition of more than one condensing agent tends to create final products having more complex structures, thereby creating a tougher film in the final product. It is understood that the reaction may be retarded and accelerated any number of times before completion, and, if desired, additional condensing agents may be added which enter the condensation reaction. If desired, an additional quantity of the original condensing agent or a mixture of the original and a different type of condensing agent may be added. It is within the scope of this invention to include the addition of an additional quantity of the same condensing agent used at the start of the reaction and/or a different one at any point in the reaction. The feature of accelerating and retarding the reaction at any desired point in the reaction is a very desirable point, and is accomplished by merely controlling the temperature. It is not necessary to add additional condensing agents to again accelerate the reaction after it has been retarded, although this may be done if so desired, as explained above.

In the above specification I have given examples and suggested certain modifications for the purpose of illustrating the invention without in any way attempting to exhaustively cover all of the various modifications and applications of my invention. Similarly, I have expressed certain theories which I have developed in the course of my investigations and practical experience with this invention, which I believe may be helpful to those who subsequently apply and extend the application of my invention. However, I have not as yet tested these theories sufficiently to set them up as certainly correct, and since the invention is in no way dependent upon the correctness of any theories which I have expressed, it is to be understood that the scope of my invention and of this application is not to be limited thereby.

I have used the term "condensation" herein broadly to mean the union of two or more organic substances, with or without the elimination of component elements.

What is claimed as new is:

1. The method of hardening drying oil which comprises condensing at super-atmospheric temperature a mixture in which the condensation reactants consist of oxidized drying oil having double bonds in conjugate arrangement and a cyclic organic compound having the characteristic structure

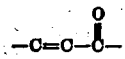

2. The method as defined in claim 1, in which the surface of the oil is protected against too rapid oxidation during at least the final drying stage of said reaction.

3. The method as defined in claim 1, in which the condensation reaction occurs in the presence of synthetic resin.

4. The method as defined in claim 1, in which the characteristic structure

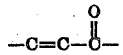

is part of a closed ring anhydride of a polycarboxylic acid.

5. The method as defined in claim 1, in which the compound having the characteristic structure is maleic anhydride.

6. The method as defined in claim 1, in which the condensed mixture is cooled before hardening is complete, giving to the mixture the useful shape which is desired of the hardened oil, and heating the shaped material at super-atmospheric temperature until hardening is complete.

7. The method as defined in claim 1, in which the hardening of the condensed mixture is carried on in an atmosphere substantially devoid of oxygen.

8. The method as defined in claim 1, in which the compound having the characteristic structure is present in amount about one-third the molecular equivalent of oil.

9. The method of hardening drying oil which comprises condensing at super-atmospheric temperature a mixture in which the condensation reactants consist of oxidized drying oil having double bonds in conjugate arrangement and a cyclic organic compound having the characteristic structure

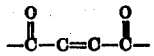

10. The method of hardening oxidized drying oil whose molecular structure includes reactive double bonds in conjugate arrangement, which comprises condensing a mixture in which the condensation reactants consist of the drying oil and cyclic organic compounds having the characteristic structure

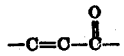

and being capable of condensation at the double bonded C atoms of the oil at super-atmospheric temperature.

11. The method of hardening drying oil into a tough, elastic film which comprises condensing a mixture in which the condensation reactants consist of drying oil having double bonds in conjugate arrangement and a cyclic organic compound having the characteristic structure

at super-atmospheric temperature until a desired viscosity is obtained, cooling the mixture, shaping the mixture to the form desired of the hardened film, and finally heating the film at super-atmospheric temperature until hardening is complete.

12. The method as described in claim 11, in which the final step of heating the shaped film occurs in an atmosphere substantially devoid of oxygen.

13. The method as described in claim 11, in which the final step of heating the shaped film occurs in a substantial atmosphere of gases given off by the shaped film.

14. The method of hardening drying oil into a tough, elastic film which comprises condensing a mixture in which the condensation reactants consist of drying oil having double bonds in conjugate arrangement and cyclic organic compounds having the characteristic structure

at super-atmospheric temperature until a desired viscosity is obtained, cooling the mixture, shaping the mixture to the form desired of the hardened film, and finally heating the film at super-atmospheric temperature until hardening is complete.

15. The method as described in claim 14, in which the final step of heating the shaped film occurs in an atmosphere substantially devoid of oxygen.

16. A composition of matter comprising a condensation mixture in which the condensation reactants consist of oxidized drying oil having double bonds in conjugate arrangement and a cyclic organic compound having the characteristic structure

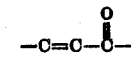

17. A composition of matter comprising a condensation mixture in which the condensation reactants consist of oxidized drying oil having double bonds in conjugate arrangement and cyclic organic compounds having the characteristic structure

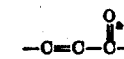

18. The method of drying an oil having double bonds in conjugate arrangement which comprises incorporating quinone with the oil and heating the mixture to a temperature above 200° F., whereby to condense the quinone with the oil.

19. The method of treating a drying oil to improve the drying properties, the step which comprises reacting a mixture which includes oxidized drying oil having double bonds in conjugate arrangement and quinone, said oil and quinone forming a condensation product at the double bonded C atoms of the oil at super-atmospheric temperature.

WALTER J. KOENIG.